United States Patent
Kumano et al.

(10) Patent No.: US 10,002,433 B2
(45) Date of Patent: Jun. 19, 2018

(54) BOUNDARY LINE RECOGNITION APPARATUS AND BRANCH ROAD DETERMINATION APPARATUS

(71) Applicants: NIPPON SOKEN, INC., Nishio, Aichi-pref. (JP); DENSO CORPORATION, Kariya, Aichi-pref. (JP)

(72) Inventors: Syunya Kumano, Okazaki (JP); Naoki Kawasaki, Kariya (JP); Shunsuke Suzuki, Aichi-ken (JP); Tetsuya Takafuji, Anjo (JP); Kazuma Hashimoto, Aichi-ken (JP)

(73) Assignees: NIPPON SOKEN, INC., Nishio, Aichi-pref. (JP); DENSO CORPORATION, Kariya, Aichi-pref. (JP)

( * ) Notice: Subject to any disclaimer, the term of this patent is extended or adjusted under 35 U.S.C. 154(b) by 114 days.

(21) Appl. No.: 14/655,698

(22) PCT Filed: Dec. 26, 2013

(86) PCT No.: PCT/JP2013/084866
§ 371 (c)(1),
(2) Date: Jun. 25, 2015

(87) PCT Pub. No.: WO2014/104183
PCT Pub. Date: Jul. 3, 2014

(65) Prior Publication Data
US 2015/0348275 A1 Dec. 3, 2015

(30) Foreign Application Priority Data

Dec. 26, 2012 (JP) ................................. 2012-283290
Dec. 26, 2012 (JP) ................................. 2012-283291

(51) Int. Cl.
*G06T 7/00* (2017.01)
*G06K 9/00* (2006.01)
*G06T 7/12* (2017.01)

(52) U.S. Cl.
CPC ........ *G06T 7/0083* (2013.01); *G06K 9/00798* (2013.01); *G06T 7/12* (2017.01);
(Continued)

(58) Field of Classification Search
None
See application file for complete search history.

(56) References Cited

U.S. PATENT DOCUMENTS

| | | | |
|---|---|---|---|
| 6,577,334 B1 | 6/2003 | Kawai et al. | |
| 2005/0270374 A1 | 12/2005 | Nishida et al. | |
| 2006/0239509 A1 | 10/2006 | Saito | |
| 2012/0057757 A1 | 3/2012 | Oyama | |

FOREIGN PATENT DOCUMENTS

| | | |
|---|---|---|
| JP | H06215290 | 8/1994 |
| JP | 2000105898 | 4/2000 |

(Continued)

OTHER PUBLICATIONS

International Search Report (translated version); International Application No. PCT/JP2013/084866, filed Dec. 26, 2013; 4 pages.
(Continued)

*Primary Examiner* — Fred Hu
(74) *Attorney, Agent, or Firm* — Knobbe, Martens, Olson & Bear, LLP

(57) ABSTRACT

In a boundary line recognition apparatus, based on luminance levels of an image captured by a camera, candidate edge points of a boundary line sectioning a travel road are extracted, and a candidate line of the boundary line is extracted. An apparent width of the candidate line on an image is calculated, from a width of the candidate line in a horizontal direction of the image and an angle of the candidate line relative to a vertical direction of the image. A
(Continued)

probability of a candidate line being a boundary line is calculated to be higher, as a degree of the candidate line having characteristics as a boundary line is higher. The calculated probabilities are integrated in respect of a plurality of characteristics to recognize a boundary line. The characteristics include a ratio of the calculated apparent width to an image blur degree is larger than a predetermined value.

10 Claims, 8 Drawing Sheets

(52) U.S. Cl.
CPC ............... *G06T 2207/10016* (2013.01); *G06T 2207/10152* (2013.01); *G06T 2207/20061* (2013.01); *G06T 2207/20076* (2013.01); *G06T 2207/30256* (2013.01)

(56) References Cited

FOREIGN PATENT DOCUMENTS

| | | |
|---|---|---|
| JP | 2001236506 | 8/2001 |
| JP | 2003337950 | 11/2003 |
| JP | 2005346383 | 12/2005 |
| JP | 2006172225 | 6/2006 |
| JP | 2006331389 | 12/2006 |
| JP | 2006349492 | 12/2006 |
| JP | 2007003286 | 1/2007 |
| JP | 2007164636 | 6/2007 |
| JP | 2012058983 | 3/2012 |
| JP | 2012106735 A | 6/2012 |
| WO | WO2014/104183 | 7/2014 |

OTHER PUBLICATIONS

International Preliminary Report on Patentability; International Application No. PCT/JP2013/084866; Filed: Dec. 26, 2013 (with English translation).

| LIKELIHOOD OF BROKEN LINE | 0 (SOLID LINE) | 1 (BROKEN LINE) |
|---|---|---|
| PROBABILITY OF BEING BRANCH ROAD | HIGH | LOW |

BOUNDARY LINE RECOGNITION APPARATUS AND BRANCH ROAD DETERMINATION APPARATUS

CROSS-REFERENCE TO RELATED APPLICATION

This application is based on and claims the benefit of priority from earlier Japanese Patent Applications No. 2012-283290 filed Dec. 26, 2012 and No. 2012-283291 filed Dec. 26, 2012 the descriptions of which are incorporated herein by reference.

BACKGROUND

Technical Field

The present invention relates to a boundary line recognition apparatus which recognizes a boundary line on a road surface sectioning a travel road, or recognizes a branch road branched from a main travel road (i.e., a current road), on the basis of image information captured by a camera mounted to a vehicle, and to a branch road determination apparatus which is used for the boundary line recognition apparatus.

Background Art

Recently, recognition apparatuses that recognize boundary lines, such white lines, of a travel road are under development for the purpose of improving automatic control or travel safety of vehicles. Such recognition is performed on the basis of image information captured by a camera mounted to a vehicle.

In order to realize improvement of automatic control or travel safety of a vehicle, erroneous recognition of a boundary line is required to be suppressed and appropriate recognition of a boundary line is required to be made in the recognition apparatus mentioned above.

From this point of view, Patent Literature 1 proposes a system in which an imaging device mounted to a vehicle captures an image of a scene including a road surface ahead of the vehicle. Based on the captured image data, the system detects two linear lines representing white lines on left and right ends of the lane on which the vehicle currently travels. The system further detects an object on the road surface in a triangular area formed between the detected two linear lines extending from an intersection point of the two linear lines to the own vehicle.

In Patent Literature 1, the road surface far ahead is ensured not to be deviated from the triangular area when the own vehicle's lane is curved ahead of the vehicle. In order to prevent the deviation, the area on the image showing the road surface ahead of the vehicle is divided into a plurality of portions in a traveling direction of the vehicle. Then, the white lines on the left and right ends of the lane on which the vehicle travels are detected sequentially from the divided area nearer the vehicle. Thus, an object is detected in the travel lane area between the detected white lines on the left and right ends.

On the other hand, for accurate detection of a boundary line mentioned above, where there is a branch road branched from the main travel road, it is necessary that the main travel road is accurately distinguished from the branch road and erroneous detection of the branch road is suppressed.

From this point of view, a system of Patent Literature 2 calculates a road curvature and a pitch angle of the vehicle on the basis of a detected lane boundary position, followed by calculating a difference between the calculated road curvature or the pitch angle and an average value of the past. If the absolute value of the difference is larger than a threshold, the detected lane boundary position is recognized as being a lane boundary position of a branch road.

CITATION LIST

Patent Literature

[Patent Literature 1] JP-A-H06-215290
[Patent Literature 2] JP-A-2005-346383

Technical Problem

According to the system described in Patent Literature 1 mentioned above, when an object detection is performed in a predetermined area with reference to the linear lines representing white lines on the left and right ends, it is necessary to suppress erroneous recognition of the linear lines representing white lines on the left and right ends to improve detection accuracy of an object.

However, in the case of a white line far ahead of the vehicle, an apparent width of a boundary line on an image is quite small. Therefore, when the contrast (edge intensity) of a boundary line relative to a road surface is lowered due to the blurring of a camera lens, a roadside object, for example, that is present along a boundary line far ahead of the vehicle tends to be erroneously recognized as being a boundary line. In particular, when a boundary line, such as a white line, is inclined in a horizontal direction on an image, this tendency becomes prominent.

On the other hand, the system described in Patent Literature 2 mentioned above extracts edge components representing a boundary line from image information to recognize the boundary line. Accordingly, an application of a disturbance to the edge components can lead to erroneous recognition of a boundary line, causing large variation in a curvature or a pitch angle calculated on the basis of the boundary line. Therefore, where a branch is determined on the basis of the variation of a boundary line as in the branch road determination method of Patent Literature 1, there is a probability that a main travel road is erroneously detected as a branch road.

SUMMARY

In light of the circumstances as described above, a main object is to improve detection accuracy for a boundary line of a travel road.

Specifically, an object is to provide a boundary line recognition apparatus which is able to suppress erroneous recognition of a boundary line far ahead of the vehicle.

A further object is to provide a branch road determination apparatus which is able to suppress erroneous detection of a branch road branched from a main road, and a boundary line recognition apparatus which utilizes the branch road determination apparatus.

According to a mode for solving the above problem, a boundary line recognition apparatus includes: a camera that is installed in a vehicle to capture an image of a travel road; a boundary line candidate extraction section that extracts candidate edge points of a boundary line sectioning the travel road, on the basis of a luminance (signal intensities) of an image captured by the camera, and extracts a candidate line of the boundary line from a series of the extracted candidate edge points; a width calculation section that calculates, in the candidate line of the boundary line extracted by the boundary line candidate extraction section, an apparent width of the candidate line on the image, from a width of the candidate line in a horizontal direction of the image and an angle of the candidate line relative to a vertical direction of the image; a boundary line characteristics calculation unit that calculates a probability of the candidate line as being the boundary line to be higher, as the candidate line has a large degree of having characteristics as a boundary line; and a boundary line recognition unit that integrates the probabilities calculated by the boundary line characteristics calculation section, in respect of a plurality of the characteristics to recognize the boundary line, wherein: a plurality of the characteristics of the boundary line include that a ratio of the apparent width calculated by the width calculation section, to a blur degree of the image is larger than a predetermined value.

According to the boundary recognition apparatus, candidate edge points of a boundary line sectioning a travel road, and a candidate line of the boundary line are extracted from a luminance of an image captured by the camera installed in the vehicle. An apparent width of the extracted candidate line on the image is calculated. Further, a probability of the candidate line as being a boundary line is calculated to be higher, as a degree of the candidate line's having characteristics as a boundary line is higher. Then, the probabilities calculated in respect of a plurality of characteristics of a boundary line are integrated to recognize a boundary line.

The inventors of the present invention noticed that, far ahead of a vehicle, when the apparent width of a boundary line becomes small relative to a blur degree of the image, the extraction accuracy of candidate edge points is lowered, which raises the probability of erroneously recognizing a roadside object, for example, which is set up along the boundary line, to be a boundary line. Where an apparent width of a boundary line has a narrow portion, a candidate line of an extracted edge, such as of a roadside object set up along the boundary line, also often has a narrow apparent width. Thus, a boundary line was permitted to include, as one of a plurality of characteristics, a property that a ratio of an apparent width of a candidate line to a blur degree of an image is larger than a predetermined value. Thus, when the probability calculated from this characteristic is reflected in integrating the probabilities of being a boundary line, a boundary line far ahead of the vehicle is suppressed from being erroneously recognized.

In order to solve the above problem, according to another mode, a branch road determination apparatus includes: a camera that is installed in a vehicle to capture an image of a travel road; a boundary line candidate extraction section that extracts candidate lines of a pair of left-and-right boundary lines sectioning the travel road, on the basis of image information captured by the camera; a curvature calculation section that calculates a curvature of the travel road; and a branch road determination section that calculates a probability of the travel road as being a branch road to be higher, as a degree of the travel road as having characteristics as a branch road is higher, and integrates the probabilities calculated in respect of a plurality of the characteristics to determine whether or not the travel road is a branch road; and a plurality of the characteristics include at least any of a point that a candidate line extracted by the boundary candidate extraction section is a solid line, and a point that the curvature calculated by the curvature calculation section is smaller than a predetermined value.

According to the branch road determination apparatus, candidate lines of a pair of left-and-right boundary lines sectioning the travel road are extracted from the image information captured by the camera installed in the vehicle. Also, a curvature of the travel road is calculated. Further, a probability of the travel road as being a branch road is calculated to be higher, as the travel road has a higher degree of having characteristics as a branch road. Then, the probabilities are integrated, which have been calculated in respect of the plurality of characteristics as a branch road, including any of a point that the extracted candidate line is a solid line, and a point that the curvature of the travel road is smaller than a predetermined value. Thus, the travel road is determined as to whether it is a branch road or not.

The inventors of the present invention noticed that the boundary line of a branch road in many cases is a solid line, not a broken line, and that a branch road is seldom established to a sharply curved travel road whose curvature is larger than a predetermined value. Also, a disturbance applied to the edge components of a boundary line hardly affects the determination as to whether a candidate line is a solid line or a broken line and the determination on the travel road as not being sharply curved. Therefore, at least either of the point that the candidate line is a solid line, and a point that the curvature of the travel road is smaller than a predetermined value is used as a characteristic of a branch road to thereby determine whether or not the travel road is a branch road. Thus, an erroneous detection of a branch road is suppressed.

Preferably, the branch road determination apparatus includes: a camera that is installed in a vehicle to capture an image of a travel road; a boundary line candidate extraction section that extracts candidate lines of a pair of left-and-right boundary lines sectioning the travel road, on the basis of image information captured by the camera; a curvature calculation section that calculates a curvature of the travel road; and a branch road determination section that calculates a probability of the travel road as being a branch road to be higher, as a degree of the travel road as having a characteristic as a branch road is higher, and integrates the probabilities calculated in respect of a plurality of the characteristics to determine whether or not the travel road is a branch road; and a plurality of the characteristics include both of a point that a candidate line extracted by the boundary candidate extraction section is a solid line, and a point that the curvature calculated by the curvature calculation section is smaller than a predetermined value.

This configuration is different from the configuration of the branch road determination apparatus mentioned above in that the plurality of characteristics as a branch road include both of a point that an extracted candidate line is a solid line, and a point that the curvature of the travel road is smaller than a predetermined value. Thus, a determination on a branch road is made with the addition of the two characteristics that can improve reliability. Thus, a branch road can be more accurately determined.

DESCRIPTION OF EMBODIMENTS

With reference to the accompanying drawings, hereinafter are described some embodiments related to the present invention.

First Embodiment

Referring first to FIGS. 1 to 7, a first embodiment is described. This embodiment relates to a boundary line recognition apparatus.

Figure 1:
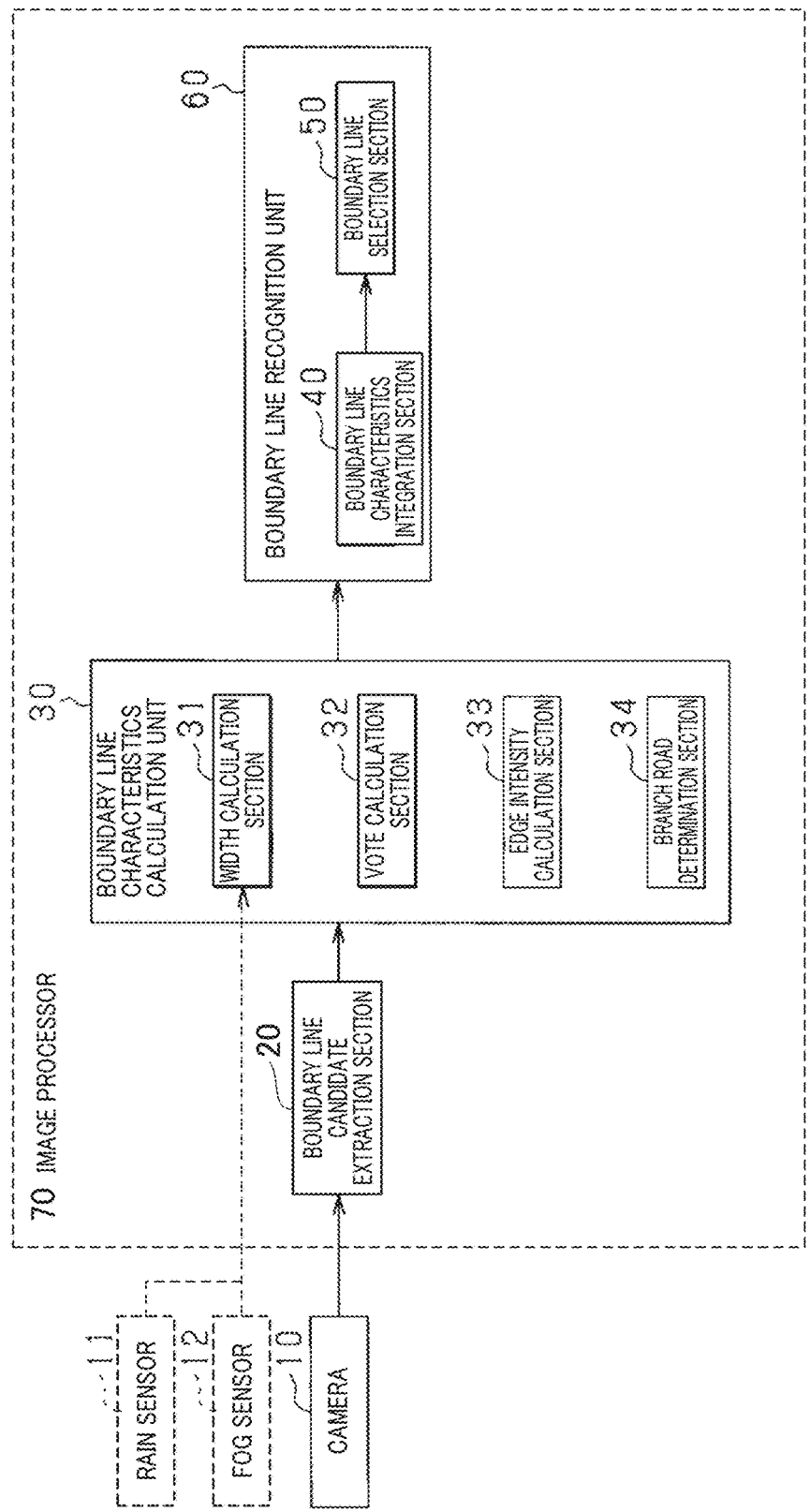
FIG. 1 is a block diagram illustrating a configuration of a boundary line recognition apparatus related to a first embodiment.

Referring to FIG. 1, hereinafter is described a configuration of the boundary line recognition apparatus related to the embodiment. The boundary line recognition apparatus related to the present embodiment includes a camera 10 and an image processor 70.

The camera 10 is a CCD camera, for example, and is fixed to a back side of a rearview mirror, for example, which is fixed being oriented to a direction ahead of the vehicle, so that an image of a travel road ahead of the vehicle can be captured. The camera 10 captures an image of a travel road ahead of the vehicle and outputs the captured image information to the image processor 70.

The image processor 70 is configured as a microcomputer that includes CPU, ROM, RAM, I/O, and a bus line connecting these components. In the present embodiment, the CPU executes a program stored in the ROM to realize functions of a boundary line candidate extraction section 20, a boundary line characteristics calculation unit 30, and a boundary line recognition unit 60.

The boundary line candidate extraction section 20 extracts candidate edge points of a boundary line, such as a white line, sectioning a travel road, on the basis of levels of luminance (pixel intensities) of an image captured by the camera 10, and extracts a candidate line of a boundary line from a series of extracted candidate edge points. In a horizontal direction intersecting a travel direction of the vehicle on an image, luminance of the image greatly changes on the left and right contour (edge) portions of one boundary line. The boundary line candidate extraction section 20 successively processes image information at a predetermined sampling cycle, the image information being acquired from the camera 10, and extracts, in a horizontal direction of the image, a plurality of points with drastically changing luminance as candidate edge points. Then, the boundary line candidate extraction section 20 applies a Hough transform to the extracted plurality of candidate edge points to acquire a series of candidate edge points, and extracts a plurality of candidate lines each having the acquired series of candidate edge points as the left and right contours.

The boundary line characteristics calculation unit 30 includes a width calculation section 31, a vote calculation section 32, an edge intensity calculation section 33 and a branch road determination section 34. The boundary line characteristics calculation unit 30 calculates a degree of having characteristics as a boundary line of the main travel road at each of the candidate edge points, for each of the plurality of candidate lines extracted by the boundary line candidate extraction section 20. As the degree of having the characteristics is higher, the probability of a candidate line as being a boundary line of the main travel road is calculated to be higher.

The inventors of the present invention noticed that, far ahead of the vehicle, when the apparent width of a boundary line becomes small relative to the blur degree of an image, the edge such as of a roadside object established along the boundary line is extracted as candidate edge points, which raises the probability of erroneously recognizing the roadside object or the like as a boundary line. Specifically, when the width of a boundary line is not larger than a predetermined width relative to the blur degree of an image, there is a high probability of erroneously recognizing a line that is not a boundary line as being a boundary line, or erroneously recognizing a boundary line as not being a boundary line. Taking this into account, a boundary line of a main travel road was characterized in that the ratio of the apparent width of the candidate line to the blur degree of an image is larger than a predetermined value.

Besides, a boundary line of a main travel road was characterized in that: the number of votes through the Hough transform is larger than a predetermined number; the edge intensity represented by a luminance differential value in a horizontal direction is larger than a predetermined value; and a travel road sectioned by a boundary line is not a branch road.

The width calculation section 31 calculates an apparent width of a candidate line at each candidate edge point. Then, if the ratio of the calculated apparent width to the blur degree of an image is smaller than a predetermined value, the probability of the candidate line as being a boundary line of the main travel road is minimized to suppress the candidate line from being recognized to be a boundary line of the main travel road.

The vote calculation section 32 minimizes the probability of a candidate line as being a boundary line of a main travel road if the number of votes through Hough transform is smaller than a predetermined number to thereby suppress the candidate line from being recognized to be a boundary line of the main travel road. The edge intensity calculation section 33 minimizes the probability of a candidate line as being a boundary line of a main travel road if the candidate line has, as signal intensities, an edge intensity smaller than a predetermined value to thereby suppress the candidate line from being recognized to be a boundary line of the main travel road. The branch road determination section 34 determines whether or not a travel road sectioned by a candidate line is a branch road. If the travel road is determined to be a branch road, the branch road determination section 34 minimizes the probability of the candidate line as being a boundary line of the main travel road to thereby suppress the candidate line from being recognized to be a boundary line of the main travel road.

The boundary line recognition unit 60 includes a boundary line characteristics integration section 40 and a boundary line selection section 50. The boundary line recognition unit 60 integrates the probabilities calculated by the boundary line characteristics calculation unit 30, in respect of the plurality of characteristics as a boundary line, thereby recognizing a boundary line.

The boundary line characteristics integration section 40 uses an arithmetic expression represented by the following Formula (1) to calculate an integrated probability by integrating the probabilities calculated by the width calculation section 31, the vote calculation section 32, the edge intensity calculation section 33 and the branch road determination section 34.

Where an integrated probability of a probability A and a probability B is expressed by X, the probabilities A and B are integrated as an integrated probability X on the basis of the following formula:

$$X=(A \cdot B)/\{A \cdot B+(1-A) \cdot (1-B)\} \quad (1)$$

First, herein, substituting the probability calculated by the width calculation section 31 for A, while substituting the probability calculated by the vote calculation section 32 for B, a probability X is calculated that is an integration of the probabilities calculated by the width calculation section 31 and the vote calculation section 32. Further, substituting the integrated probability X that is an integration of the probabilities calculated by the width calculation section 31 and the vote calculation section 32 for A, while substituting the probability calculated by the edge intensity calculation section 33 for B, a probability X is calculated that is an integration of the probabilities calculated by the width calculation section 31, the vote calculation section 32 and the edge intensity calculation section 33. In this way, the probabilities are sequentially integrated to integrate the probabilities that have been calculated by the boundary line characteristics calculation unit 30 in respect of the plurality of characteristics as a boundary line. It should be noted that the characteristics of a boundary line are not limited to the four characteristics mentioned above. In respect of other characteristics as a boundary line as well, probabilities of a candidate line as being a main travel road may be calculated, followed by integrating the calculated probabilities.

The boundary line selection section 50 determines whether or not a candidate line is a boundary line on the basis of the probability integrated by the boundary line characteristics integration section 40, selects a candidate line to be recognized as the boundary line of a main travel road, and selects the candidate edge points included in the candidate line. Specifically, of the candidate lines each having a probability higher than a threshold based on which a candidate line can be determined to be a boundary line, the boundary line selection section 50 selects candidate edge points representing a contour of a candidate line closest to the vehicle, the candidate line being one of paired candidate lines on the left and right sides of the vehicle.

When a vehicle is under automatic control, the shape of a candidate line selected by the boundary line selection section 50 is used as a basis for setting an amount of steering of the vehicle or for detecting an object on the road surface. Further, when the vehicle has traveled out of the selected candidate line, an alarm is outputted. Specifically, a candidate line selected as a boundary line of a main travel road is set as a boundary line that is a control objective, and various automatic controls for the vehicle are performed.

Figure 2:
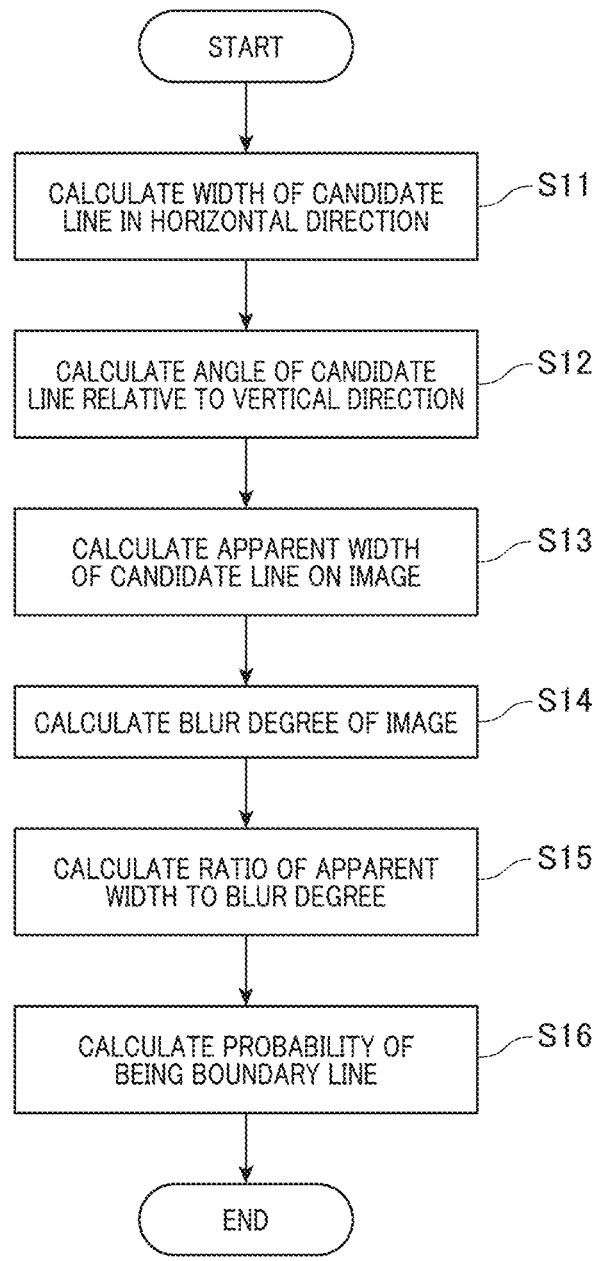
FIG. 2 is a flowchart illustrating a process of calculating a probability of being a boundary line on the basis of an apparent width of a candidate line.

Referring now to FIG. 2, hereinafter are described the details of a process of calculating a probability of being a boundary line. The present process is performed by the width calculation section 31.

Figure 3:
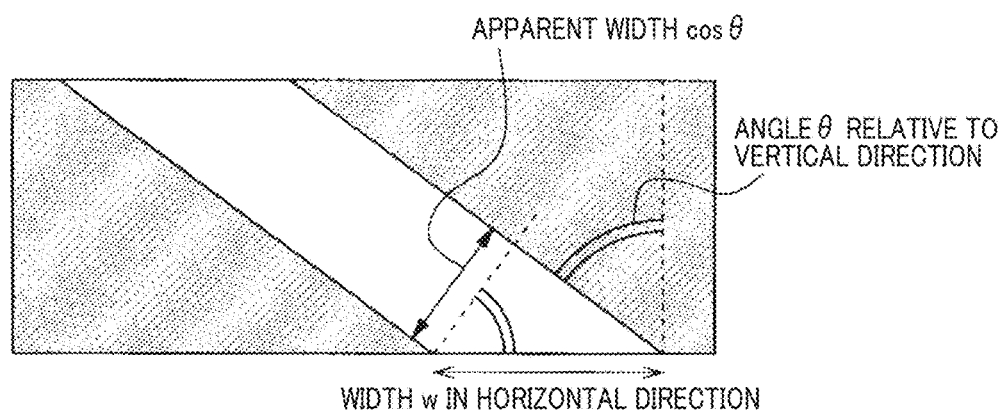
FIG. 3 is a diagram illustrating an apparent width and a horizontal width of a candidate line.

First, at step S11, the width calculation section 31 calculates a width w of a candidate line in a horizontal direction of an image. Then, at step S12, the width calculation section 31 calculates an angle θ of the candidate line relative to a vertical direction (travel direction of the vehicle). Then, at step S13, the width calculation section 31 calculates an apparent width of the candidate line on the image. As shown in FIG. 3, the apparent width of a candidate line on an image corresponds to a width of a candidate line in a direction perpendicular to an extending direction of the candidate line. The apparent width of a candidate line is calculated as w·cos θ on the basis of the width w of the candidate line in the horizontal direction as calculated at step S11 and the angle θ of the candidate line relative to the vertical direction as calculated at step S12. Pixel is the unit of an apparent width of a candidate line on an image.

Figure 4:
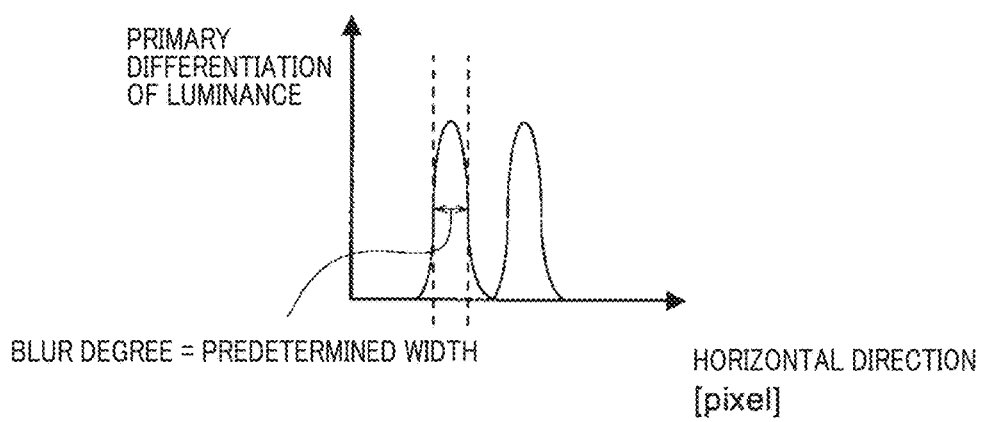
FIG. 4 is a diagram illustrating primary (first) differential distribution obtained by horizontally differentiating the luminance of a candidate line.

Then, at step S14, a blur degree of an image is calculated. Specifically, as shown in FIG. 4, the width calculation section 31 differentiates the luminance of the surroundings including candidate edge points in a horizontal direction of an image to calculate a primary (first) differential distribution, so that a predetermined width of the calculated primary differential distribution is used as a blur degree of the image.

In an ideal condition where an image is not blurred, the primary differential distribution of luminance levels (i.e., pixel intensities, pixel values) in the horizontal direction of an image exhibits a sharp peak at the left and right edge portions of a boundary line with no expansion. In contrast, where an image is blurred due to the specification of a lens, rain or the like, the primary differential distribution exhibits a large expansion at the left and right edge portions. Therefore, a predetermined width that represents a degree of expansion of a primary differential distribution is used as a blur degree of an image.

Figure 5:
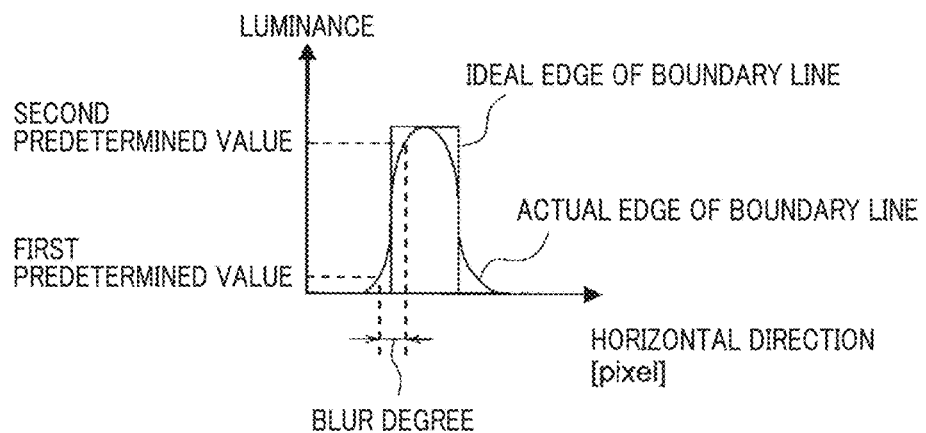
FIG. 5 is a diagram illustrating luminance distribution of a candidate line in a horizontal direction.

Alternatively, as shown in FIG. 5, in a luminance distribution of the surroundings including candidate edge points distributed in the horizontal direction of an image, the blur degree of an image is represented by a width where luminance from a first predetermined value to a second predetermined value that is larger than the first predetermined value is distributed.

In an ideal condition where an image is not blurred, the luminance distribution of a boundary line in the horizontal direction of an image exhibits a sharp peak that drastically rises from a minimum luminance to a maximum luminance in the left and right edge portions of a boundary line. In contrast, where an image is blurred due to the specification of a lens, rain or the like, the luminance distribution exhibits a dull expansion at the left and right edge portions of a boundary line, more moderately rising from a minimum luminance to a maximum luminance than in the ideal condition. In this luminance distribution, the width where luminance of from the first predetermined value to the second predetermined value is distributed well represents a degree of expansion of the edge portions of the boundary line. For this reason, the blur degree of an image is represented by the width where luminance from the first predetermined value to the second predetermined value is distributed relative to a maximum luminance.

It is true that there is a difference between a direction of an apparent width on an image, a differential direction of a primary differential distribution, and a distribution direction of a luminance distribution. However, whichever of the two blur degree calculation methods mentioned above may be used, a blur degree can be roughly calculated. Further, whichever of the two blur degree calculation methods mentioned above may be used, the blur degree of an image is approximately the same, and pixel is the unit.

Then, at step S15, the width calculation section 31 calculates a ratio of the apparent width of the candidate line relative to the blur degree of the image, on the basis of the blur degree of the image calculated at step S14 and the apparent width of the candidate line calculated at step S13. Specifically, the apparent width of the candidate line is divided by the blur degree of the image to calculate the ratio.

Figure 6:
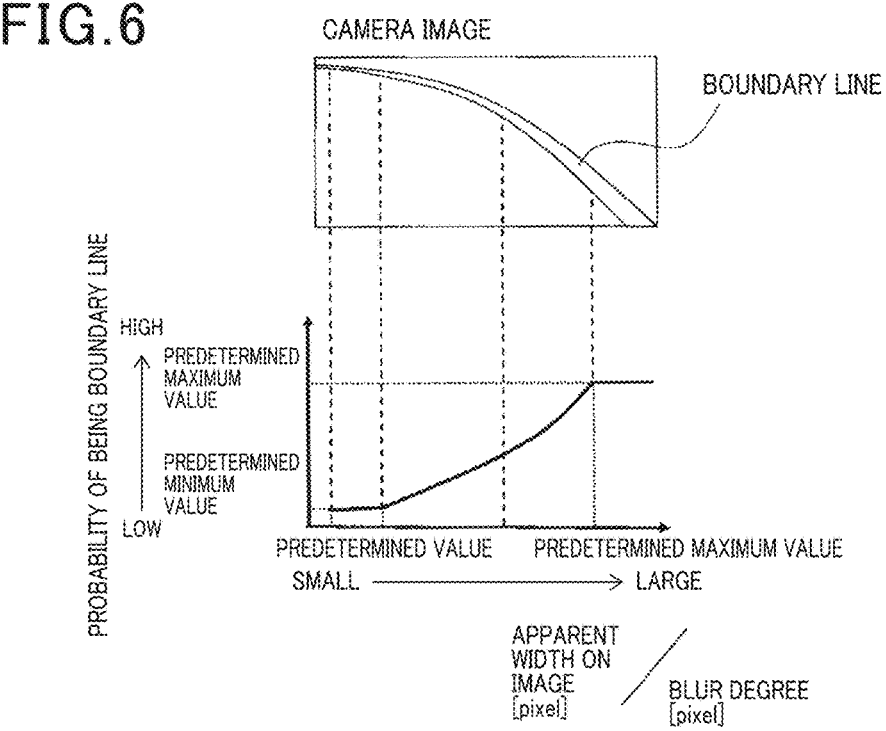
FIG. 6 is a diagram illustrating correlation between ratio of apparent width to blur degree, and probability of being a boundary line.

Then, at step S16, a probability map shown in FIG. 6 is used to calculate a probability of the candidate line as being a boundary line, on the basis of the ratio of the apparent width of the candidate line to the blur degree of the image as calculated at step S15.

When a boundary line is far ahead of the vehicle, the apparent width of the boundary line on an image is smaller than when the boundary line is near the vehicle. In particular, as shown in FIG. 6, when a boundary line is curved in a horizontal direction on an image, the apparent width of the boundary line on the image is quite small far ahead of the vehicle, and at the same time, the edge portions of the boundary line tend to be blurred. Therefore, the apparent width of the boundary line on the image is smaller far ahead of the vehicle, relative to the blur degree of the image, than in the vicinity of the vehicle. At the same time, the edge portions far ahead of the vehicle are hardly distinguished from portions other than the edge portions, and thus the accuracy of extracting the candidate edge points and the edge line is lowered.

If the ratio of the apparent width of a candidate line on the image to the blur degree of the image is smaller than a predetermined value, the apparent width of the candidate line on the image is smaller compared to the blur degree of the image. Accordingly, it is difficult to distinguish the edge portions of the boundary line from portions other than the edge portions. For this reason, if the ratio is smaller than the predetermined value, the probability of being a boundary line is rendered to be a predetermined minimum probability to thereby suppress erroneous recognition of a boundary line. On the other hand, if the ratio is larger than a predetermined maximum value, i.e. if the apparent width of the candidate line on the image is larger compared to the blur degree of the image, reliability is well enhanced in determining as to whether or not the candidate line is a boundary line. For this reason, if the ratio is larger than the predetermined maximum value, the probability of being a boundary line is rendered to be a predetermined maximum probability. Further, if the ratio is between the predetermined value and the predetermined maximum value, the probability of the candidate line's being a boundary line is made smaller, as the ratio of the apparent width of the candidate line to the blur degree of the image is smaller.

It should be noted that the predetermined minimum probability is a value that makes the integrated probability to be very small, when the boundary line characteristics integration section 40 integrates the probabilities calculated in respect of the plurality of characteristics as a boundary line. That is, the predetermined minimum probability is a value that suppresses a candidate line from being recognized to be a boundary line.

After the processing described so far, the present process is terminated. The width calculation section 31 then outputs the probability of being a boundary line as calculated at step S16 to the boundary line characteristics integration section 40.

Figure 7:
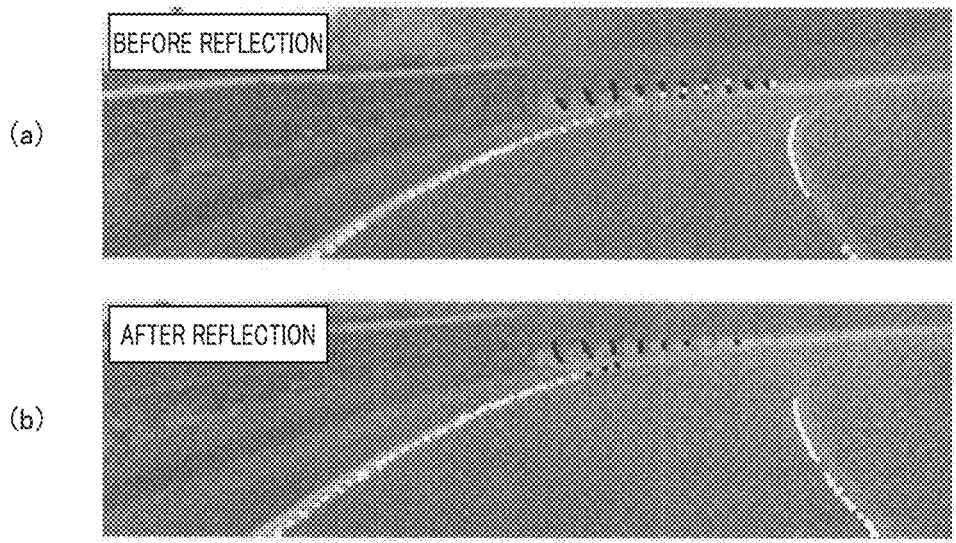
FIG. 7 shows diagrams indicating boundary lines recognized before and after including a probability of being a boundary line that has been calculated on the basis of an apparent width of a candidate line.

FIG. 7 shows by (a) and (b) an example of a result of recognition of a boundary line performed by the image processor 70. White squares indicate candidate edge points selected by the boundary line selection section 50, and black squares indicate excluded candidate edge points. FIG. 7 shows by (a) the case where the probability calculated by the width calculation section 31 is not reflected to the probability that is an integration of the probabilities of being a boundary line calculated in respect of the plurality of characteristics as a boundary line. In contrast, FIG. 7 shows by (b) the case where the probability calculated by the width calculation section 31 is reflected to the probability that is an integration of the probabilities of being a boundary line calculated in respect of the plurality of characteristics as a boundary line.

In (a) and (b) of FIG. 7, the travel road is curved far ahead of the vehicle. In the vicinity of the curve, poles are set up at regular intervals along the left side of the travel road. In the vicinity of the curve, the edges of the poles are extracted as candidate edge points.

The candidate edge points representing the poles should be excluded from the candidate edge points selected as a boundary line. However, in (a) of FIG. 7, a portion of the candidate edge points representing the poles and having a high continuity from the boundary line is selected as the boundary line of the main travel road. In other words, in the vicinity of the curve, a series of the candidate edge points representing the poles is erroneously recognized to be a boundary line. In contrast, in (b) of FIG. 7, the series candidate edge points erroneously recognized to be a boundary line in (a) of FIG. 7 is not selected as a boundary line of the main travel road. Relative to the blur degree of the image, the candidate line composed of the series of candidate edge points representing the poles has a small apparent width. Accordingly, the probability calculated by performing the processings of steps S11 to S16 is low, thereby lowering the integrated probability obtained from the boundary line characteristics integration section 40. As a result, in (b) of FIG. 7, the candidate edge points representing the poles are not selected as a boundary line of the main travel road.

According to the present embodiment described so far, the following advantageous effects are obtained.

In integrating the probabilities of a boundary line's being a candidate line, the integration is permitted to reflect a probability calculated in respect of the characteristic that the ratio of the apparent width of a candidate line to the blur degree of an image is larger than a predetermined value. Thus, a boundary line far ahead of the vehicle is suppressed from being erroneously recognized.

The probability of an extracted candidate as being a boundary line is made smaller, as the ratio of the apparent width of the candidate line to the blur degree of an image is smaller. Thus, erroneous recognition of a boundary line is suppressed.

The blur degree of an image is calculated on the basis of a predetermined width in a differential value distribution of luminance, or a distribution width of a predetermined luminance relative to a maximum luminance. Thus, the blur degree can reflect the specification and condition of a lens.

Other Embodiments

The present invention should not be construed as being limited to the embodiment described above, but may be implemented with the following modifications.

A primary differential distribution (i.e., a distribution of first differentials (gradients)) may be calculated by differentiating the luminance of the surroundings including candidate edge points, in a direction of the angle θ relative to the horizontal direction of the image, i.e. in a direction of the apparent width of a candidate line on the image, to use a predetermined width of the calculated primary differential distribution as a blur degree of the image. In this way, the accuracy of the blur degree on an image can be improved.

In the luminance distribution of the surroundings including candidate edge points distributed in the direction of the angle θ relative to the horizontal direction of the image, the blur degree of an image may be represented by the width where luminance of from the first predetermined value to the second predetermined value is distributed. In this way, the accuracy of the blur degree on an image can be improved.

The specification value of an amount of blurring of a lens possessed by the camera 10 may be converted to a length on an image and the converted value may be used as a blur degree of the image. This can facilitate the calculation of the ratio of the apparent width of a candidate line on an image to the blur degree of the image. Further, a blur degree of high accuracy can be obtained under any conditions except for rain or fog.

Under the condition of fog or rain, the rain or fog raises the blur degree of an image beyond the amount of blurring of the lens. Therefore, under the condition of rain or fog, the amount of blurring may be ensured to be increased by correction. Specifically, as indicated by the broken lines in FIG. 1, the vehicle may be installed with a rain sensor 11 (rain detecting means) that detects rain and a fog sensor 12 (fog detecting means) that detects fog. When rain or fog is detected by the rain sensor 11 and the fog sensor 12, the converted value of the specification value of the amount of blurring of the lens is corrected to be increased, and the corrected value is used as a blur degree of the image.

Thus, under the condition of rain or fog, the accuracy of the blur degree of an image can be improved to thereby more suppress an erroneous detection of a boundary line. Alternative to the rain sensor 11, a windshield wiper switch may be turned on for the detection of rain. Alternative to the fog sensor 12, a fog lamp switch may be turned on for the detection of fog.

Further, after detecting the amount of rain or fog by the rain sensor 11 and the fog sensor 12, as the amount of rain or fog is larger, the converted value of the specification value of the amount of blurring of the lens may be corrected to be a larger value. Thus, the accuracy of the blur degree of an image can be further improved under the condition of rain or fog.

For the ratio of the apparent width of a candidate line on an image to the blur degree of an image, a reference value is set between a predetermined value and a predetermined maximum value set in the foregoing embodiment. If the ratio is larger than the reference value, the probability of being a boundary line may be calculated, for example, to be a predetermined high probability, and if smaller, the probability of being a boundary line may be calculated, for example, to be a predetermined low probability. In other words, a probability of being a boundary line may be set to two discrete values.

Second Embodiment

Referring now to FIGS. 8 to 12, hereinafter is described a branch road determination apparatus as a second embodiment.

In this embodiment, description is focused on a configuration of the branch road determination apparatus (one mode of the boundary line recognition apparatus). It should note that, in the present embodiment, the components identical with or similar to those in the first embodiment are given the same reference numerals for the sake of simplifying or omitting the explanation.

Figure 8:
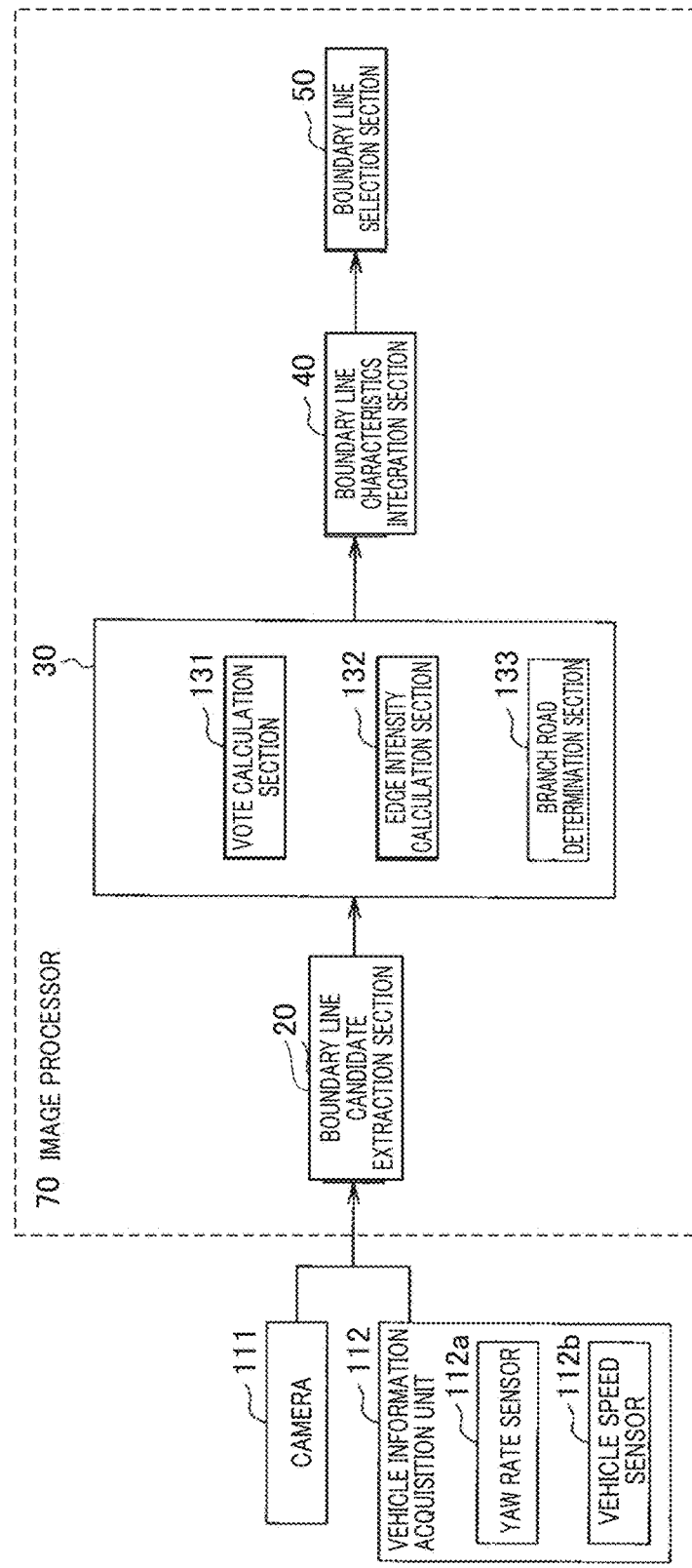
FIG. 8 is a block diagram illustrating a configuration of a branch road determination apparatus related to a second embodiment.

As shown in FIG. 8, the branch road determination apparatus related to the present embodiment includes a camera 111, a vehicle information acquisition unit 112 (curvature calculation unit), and an image processor 70.

The camera 11 is configured and arranged in a manner similar to the camera described in the foregoing embodiment. The camera 111 captures an image of the travel road ahead of the vehicle and outputs the captured image information to the image processor 70.

The vehicle information acquisition unit 112 includes a yaw rate sensor 112a and a vehicle speed sensor 112b. The vehicle information acquisition unit 112 calculates a curvature at the center of the travel road, from an angular velocity (yaw rate) in the turning direction of the own vehicle detected by the raw rate sensor 112a, and a vehicle speed detected by the vehicle speed sensor 112b, and outputs the calculated curvature of the travel road to the image processor 70.

Similar to the first embodiment described above, the image processor 70 is configured as a microcomputer that includes CPU, ROM, RAM, I/O and a bus line connecting these components. In the present embodiment, a program stored in the ROM is executed by the CPU to realize the functions of the boundary line candidate extraction section 20, the boundary line characteristics calculation unit 30, the boundary line characteristics integration section 40 and the boundary line selection section 50.

The boundary line candidate extraction section 20 extracts candidate lines of a pair of left-and-right boundary lines, such as white lines, which section the travel road. The boundary line candidate extraction section 20 successively processes image information at a predetermined sampling cycle, the image information being acquired from the camera 111 configured similar to the camera of the foregoing embodiment. The boundary line candidate extraction section 20 extracts a plurality of points, as edge points, that have drastically changing luminance, in a horizontal direction that intersects the vehicle's travel direction on an image. The boundary line candidate extraction section 20 applies a Hough transform to the extracted plurality of edge points to extract a plurality of candidate lines of boundary lines on the left and right sides of the vehicle, the boundary lines sectioning the travel road on which the own vehicle travels.

The boundary line characteristics calculation unit 30 as hardware is configured similar to the one in the foregoing embodiment, and includes a vote calculation section 131, an edge intensity calculation section 132 and a branch road determination section 133. The boundary line characteristics calculation unit 30 calculates a degree of having characteristics as a boundary line of the main travel road, for each of the extracted plurality of candidate lines. As the degree of having the characteristics is higher, the probability of the candidate line's being a boundary line of the main travel road is calculated to be higher.

The characteristics of the boundary line of the main travel road include, for example, that: the number of votes through the Hough transform is larger than a predetermined number; the edge intensity indicated by a horizontal luminance differential value is larger than a predetermined value; and the travel road sectioned by the boundary lines is not a branch road.

When the number of votes through the Hough transform is smaller than a predetermined number, the vote calculation section 131 minimizes the probability of a candidate line as being a boundary line to suppress the candidate line from being recognized to be a boundary line of the main travel road. When the edge intensity at an edge point included in a candidate line is smaller than a predetermined value, the edge intensity calculation section 132 minimizes the probability of the candidate line as being a boundary line of the main travel road to suppress the candidate line from being recognized to be a boundary line. The branch road determination section 133 determines whether or not the travel road sectioned by candidate lines is a branch road. When the road is determined to be a branch road, the branch road determination section 133 turns the probability of a candidate line as being a boundary line of the main travel road to zero to prevent the candidate line from being recognized to be a boundary line of the main travel road.

The boundary line characteristics integration section 40 mutually multiplies the probabilities calculated by the boundary line characteristics calculation unit 30, in respect of the plurality of characteristics of a boundary line of a travel road, to integrate the probabilities of a candidate line being a boundary line of the main travel road. It should be noted that the characteristics of the boundary line are not limited to the three characteristics mentioned above. A probability of a candidate line being a boundary line of the main travel road may be calculated in respect of each of other characteristics of a boundary line, and the calculated probabilities may be integrated.

The boundary line selection section 50 selects a candidate line to be recognized as a boundary line of the main travel road, on the basis of the integrated probability obtained from the boundary line characteristics integration section 40. Specifically, of the candidate lines having a high integrated probability, a candidate line closest to the vehicle is selected, the candidate line being one of paired candidate lines on the left and right sides of the vehicle.

When the vehicle is under automatic control, an amount of steering of the vehicle is set on the basis of the shape of the candidate line selected by the boundary line selection section 50. Further, when the vehicle has traveled out of the selected candidate line, an alarm is outputted. Specifically, a candidate line selected as a boundary line of the main travel road is set as a boundary line of a control objective, and various automatic controls for the vehicle are performed.

Figure 9:
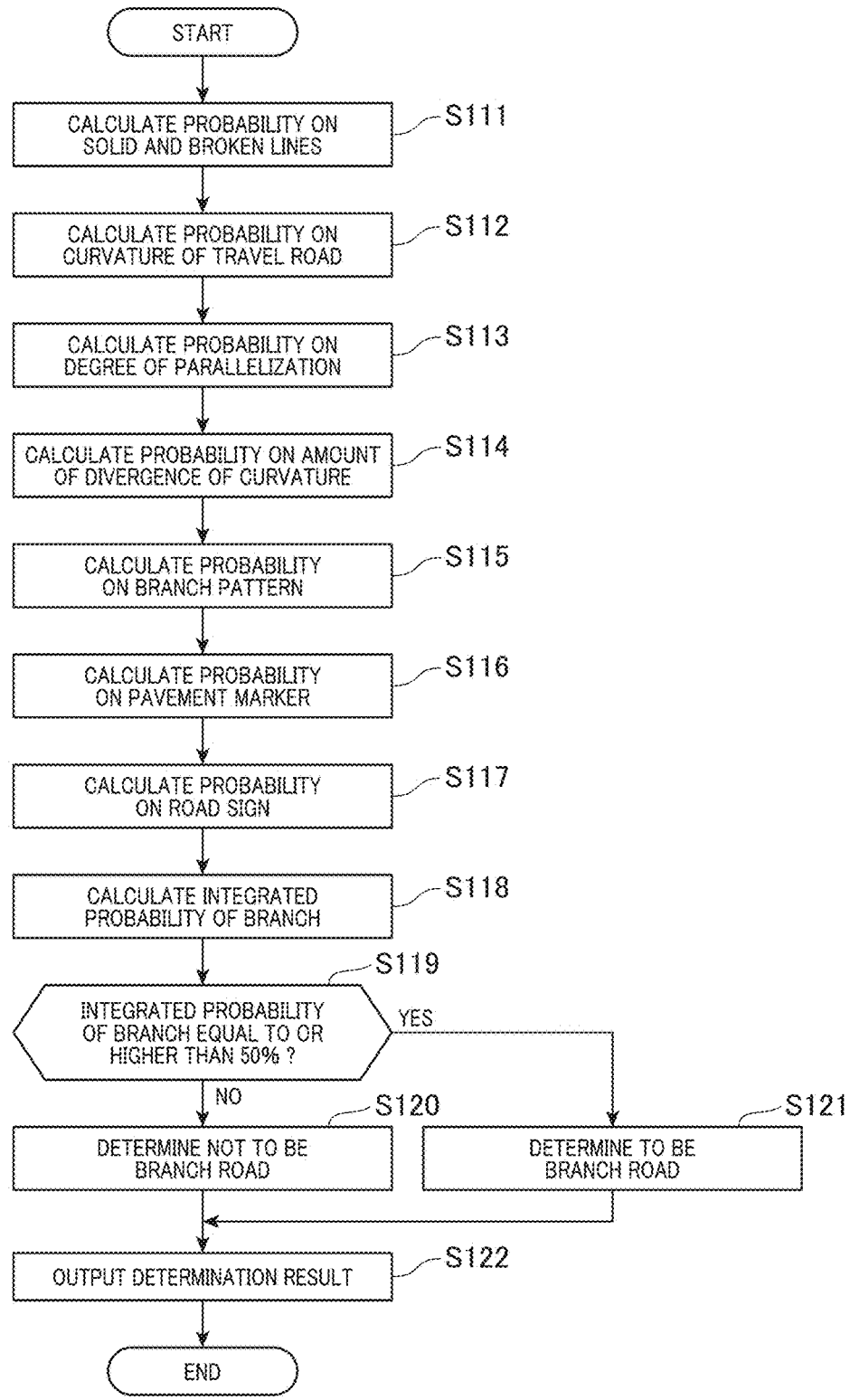
FIG. 9 is a flowchart illustrating a process of determining a branch road.

With reference to steps S111 to S122 of FIG. 9, hereinafter are described the details of a process of branch road determination performed by the branch road determination section 133. In the present branch road determination, the probability that a travel road sectioned by candidate lines is a branch road is calculated to be higher, as the travel road has a higher degree of having characteristics as a branch road. Then, the probabilities of being a branch road calculated in respect of the plurality of characteristics are integrated. Based on the integrated probability, it is determined whether or not the travel road is a branch road. In the present branch road determination, the candidate line on the left side of the travel road is determined as to whether or not the candidate line is branched leftward, and the candidate line on the right side of the travel road is determined as to whether or not the candidate line is branched rightward.

The inventors of the present invention noticed that the boundary line of a branch road in many cases is a solid line, not a broken line, and that a branch road is seldom established to a travel road with a sharp curve whose curvature is larger than a predetermined value. In this regard, at steps S111 and S112, a branch road is characterized in that: a candidate line extracted by the boundary line candidate extraction section 20 is a solid line; and the curvature of the travel road calculated by the vehicle information acquisition unit 112 is smaller than a predetermined value, thereby calculating a probability of the travel road being a branch road in respect of these characteristics.

First, at step S111, the branch road determination section 133 calculates a probability of the travel road as being a branch road, on the basis of whether a candidate line is a solid line or a broken line. As shown in a table of FIG. 10, if the candidate line is a solid line as a result of determining whether the candidate line is a solid line or a broken line, the probability of the travel road's being a branch line is rendered to be a predetermined high probability. If the candidate line is a broken line, the probability of the travel road's being a branch line is rendered to be a predetermined low probability. The predetermined high probability is a value that neither raises nor lowers the probability that is an integration of the probabilities calculated in respect of the plurality of characteristics. Specifically, if the candidate line is a solid line, the probability of being a branch line is not lowered, but not raised, either, such that the travel road is positively determined to be a branch road. On the other hand, the predetermined low probability is a value that lowers the probability that is an integration of the probabilities calculated in respect of the plurality of characteristics, but does not permit the probability of determining the travel road's being a branch road to be 0. In other words, when the candidate line is a broken line, while the probabilities calculated in respect of other characteristics are sufficiently high, the travel road may be determined to be a branch road.

Whether a candidate line is a solid line or a broken line is determined as follows. Specifically, when edge points are included in series on a candidate line, and there is no blank portion from where an edge point is absent, the candidate line is determined to be a solid line. However, when there is any blank portion on a candidate line, from where an edge point is absent, the candidate line is determined to be a broken line.

Figures 10, 11:
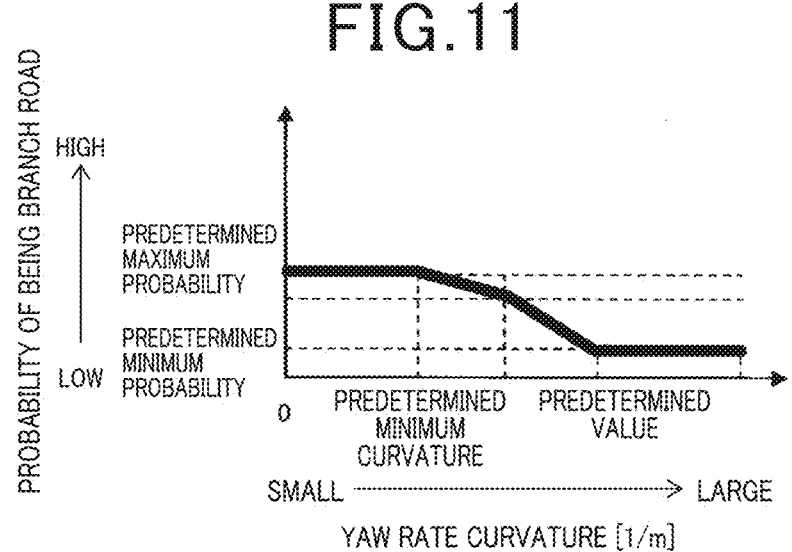
FIG. 10 is a table showing a probability of being a branch road relative to solid line and broken line.
FIG. 11 is a diagram illustrating a probability of being a branch road relative to curvature of a travel road.

Then, at step S112, the branch road determination section 133 calculates a probability of the travel road's being a branch road from the curvature of the travel road calculated by the vehicle information acquisition unit 112. As shown in FIG. 11, as the curvature of the travel road is larger, the probability of the travel road's being a branch road is calculated to be lower. Specifically, when the curvature of the travel road is larger than a predetermined value, the travel road is very sharply curved and thus a branch road is seldom established. Accordingly, the probability of being a branch road is rendered to be a predetermined minimum probability to suppress the travel road from being determined to be a branch road. When the curvature of the travel road is smaller than a predetermined minimum curvature, i.e. when the travel road is gently curved or straight, a branch road is estimated to be established with a normal probability. Accordingly, the probability of being a branch road is rendered to be a predetermined maximum probability so as not to suppress a determination that the travel road is a branch road. When the curvature of the travel road is between the predetermined minimum curvature and the predetermined value, the probability of being a branch road is made lower, as the curvature of the travel road is larger. It should be noted that, at step S112, a common probability of being a branch road is calculated for both the left candidate line and the right candidate line.

Then, at steps 113 to S117, probabilities of the travel road being a branch road are calculated, in respect of other characteristics as a branch road. At step S113, a branch road is characterized in that the degree of parallelization of the left and right candidate lines is lower than a predetermined value. Thus, as the travel road has a higher degree of parallelization between the left and right candidate lines, the probability of being a branch road is calculated to be lower. The degree of parallelization becomes lower as the difference is larger between the curvature calculated from the shape of the left candidate line and the curvature calculated from the shape of the right candidate line. In the case of a straight travel road where the degree of parallelization is the highest, the probability of being a branch road is minimized. It should be noted that, at step S113, a common probability of being a branch road is calculated for both of the left and right candidate lines.

At step S114, a branch road is characterized in that the candidate line has a curvature whose amount of divergence is larger than a predetermined amount. Thus, the probability of being a branch road is calculated to be higher, as the amount of divergence of the curvature is larger. The amount of divergence of a curvature is calculated on the basis of the shape of the left and right candidate lines, relative to the curvature at the center of the travel road calculated by the vehicle information acquisition unit 112.

Then, at step S115, a branch road is characterized in that the width of the travel road corresponds to a branch pattern. Thus, the probability of being a branch road is calculated to be higher when the width of the travel road is broadened, than when not broadened. When the travel road is broadened leftward, the probability of being a leftward branch road is raised. When the travel road is broadened rightward, the probability of being a rightward branch road is raised.

Then, at step S116, a branch road is characterized in that there is an indication of branch information with a pavement marker. Thus, the probability of the travel road's being a branch road is calculated to be lower when there is no indication of branch information with a pavement marker, than when there is an indication. In many cases, there is generally an indication of branch information, such as an arrow, on a road surface at a spot where a branch road is branched from the main travel road. Accordingly, the road surface indication is acquired from the image information and the acquired road surface indication is compared with branch information, such as arrows, registered in a database. As the branch information included in the pavement marker is smaller, the probability of the travel road's being a branch road is lowered.

Then, at step S117, a branch road is characterized in that there is an indication of branch information with a road sign. Thus, the probability of the travel road's being a branch road is calculated to be lower when there is not an indication of branch information with a road sign, than where there is an indication. In many cases, there is generally an indication of branch information, such as an arrow, on a road sign at a spot where a branch road is branched from the main travel road. Accordingly, the road sign is acquired from the image information and the acquired road sign is compared with branch information, such as arrows, registered in a database. As the branch information included in the road sign is smaller, the probability of the travel road's being a branch road is lowered.

Then, at step S118, the probabilities of being a branch road calculated in respect of the plurality of characteristics as a branch road at steps S111 to S117 are integrated to thereby calculate an integrated probability using the arithmetic expression of Formula (1) described above.

First, substituting the probability calculated at step S111 for A, while substituting the probability calculated at step S112 for B, a probability X is calculated that is an integration of the probabilities calculated at steps S111 and S112, from the arithmetic expression of Formula (1).

Further, substituting the probability X that is an integration of the probabilities calculated at steps S111 and S112 for A, while substituting the probability calculated at step S113 for B, a probability X is calculated that is an integration of the probabilities calculated at steps S111 to S113. In this way, the probabilities are sequentially integrated to integrate the probabilities calculated at steps S111 to S117, on the basis of the arithmetic expression of Formula (1).

Then, at step S119, it is determined whether or not the integrated probability calculated at step S118 is equal to or more than 50%. If the integrated probability is not equal to or more than 50% (NO), it is determined, at step S120, that the travel road is not a branch road. If the integrated probability is equal to or more than 50% (YES), it is determine, at step S121, that the travel road is a branch road.

Then, at steps S122, the branch road determination section 133 outputs the results of determination on a branch road made at step S120 or S121 to the boundary line characteristics integration section 40. If the branch road determination section 133 determines the travel road to be a branch road, the probability is 0 that the candidate line is the boundary line of the main travel road. Therefore, of the candidate lines extracted by the boundary line candidate extraction section 20, a candidate line to be recognized as a boundary line of the main travel road is selected by the boundary line selection section 50 from among the candidate lines excluding the boundary line of the travel road that has been determined to be a branch road.

Figure 12:
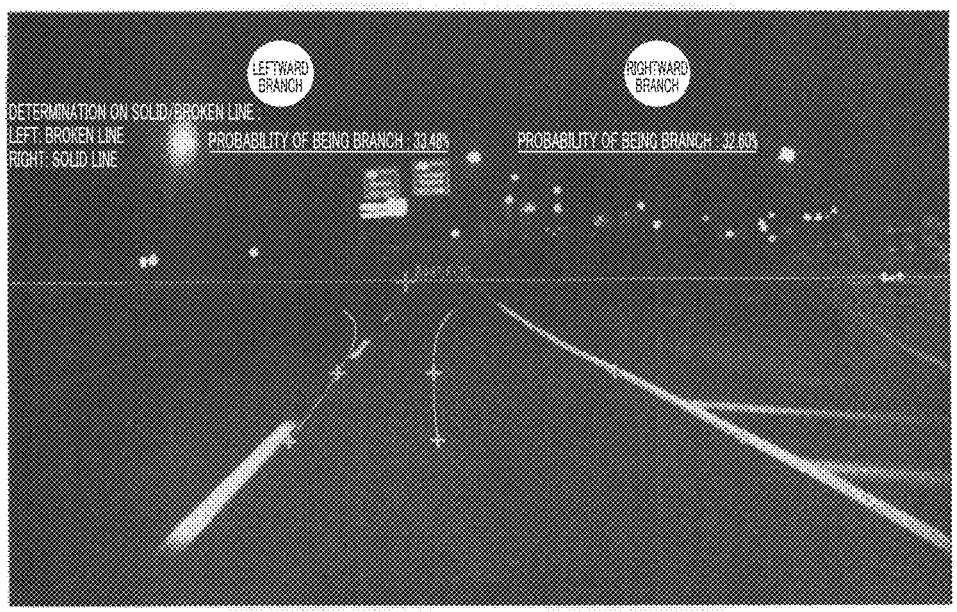
FIG. 12 is a diagram illustrating an example of a result of determination made on a branch road.

FIG. 12 shows an example of the branch road determination. As shown, when a curvature estimation accuracy calculated from the shape of the left candidate line is lowered being affected by the pitching of the vehicle, the probabilities of being a branch road calculated at steps S111 to S114 are integrated, followed by indicating a result of a determination made on a branch road. Specifically, an example of a result of a determination on a branch road is indicated, with the characteristics of a branch road being that: the candidate line is a solid line; the curvature of the travel road is smaller than a predetermined value; the degree of parallelization of the left and right candidate lines is lower than a predetermined value; and the amount of divergence of the curvature of the candidate line is larger than a predetermined amount.

Being affected by pitching, a probability of being a leftward branch road is calculated to be high, at step S114, from the amount of divergence of the left candidate line. However, the determination on the left candidate line as being a broken line made at step S111 can lower the integrated probability of the travel road's being a leftward branch line. As a result, the integrated probability of being a leftward branch road is 0.3348 (33.48%) and the integrated probability of being a rightward branch road is 0.3260

(32.60%), both of which are less than 50%. Accordingly, the main travel road is not erroneously determined to be a branch road.

The present embodiment described so far has the following advantageous effects.

- In many cases, a branch road has a boundary line of a solid line, not a broken line. Also, a branch road is seldom established to a sharply curved travel road whose curvature is larger than a predetermined value. Further, a disturbance applied to the edge components of a boundary line hardly affects the determination as to whether a candidate line is a solid line or a broken line, and the determination on the travel road's not being sharply curved. Therefore, a determination as to whether or not the travel road is a branch road is made, with a branch road being permitted to have both of the characteristics that: the candidate line is a solid line; and the curvature of the travel road calculated by the vehicle information acquisition unit 112 is smaller than a predetermined value. Thus, an erroneous detection of a branch road is suppressed.
- When a candidate line is not a solid line, the travel road sectioned by the candidate line has a low probability of being a branch road. Accordingly, when a candidate line is not a solid line, the probability of the travel road's being a branch line is made lower than the probability in the case of a solid line, thereby correctly determining a branch road.
- A travel road having a larger curvature has a lower probability of being established with a branch road. Accordingly, the probability of the travel road's being a branch road is made lower as the travel road has a larger curvature. Thus, an erroneous detection of a branch road is suppressed.
- When the curvature of a travel road is larger than a predetermined value, the probability of the travel road's being a branch road is rendered to be a predetermined minimum probability. Accordingly, unless the probabilities calculated in respect of other characteristics of a branch road are sufficiently high, the travel road is not determined to be a branch road. Thus, an erroneous detection of a branch road is suppressed.
- When the curvature of a travel road is smaller than a predetermined minimum curvature, it is estimated that a branch road is established to the travel road with a normal probability. Accordingly, when the curvature of the travel road is smaller than a predetermined minimum curvature, the probability of the travel road's being a branch road is rendered to be a predetermined maximum probability. Thus, the travel road is not suppressed from being determined to be a branch road.
- The curvature of a travel road calculated by the vehicle information acquisition unit 112 is hardly affected by disturbances. A branch road can be determined, using such a curvature of the travel road, which is hardly affected by a disturbance. Thus, an erroneous detection of a branch road is further suppressed.
- When there is no indication of branch information with a pavement marker, the probability of a candidate line as being a branch road is lowered compared to the case where there is an indication. Thus, an erroneous detection of a branch road is further suppressed.
- When there is no indication of branch information with a road sign, the probability of a candidate line as being a branch road is lowered compared to the case where there is an indication. Thus, an erroneous detection of a branch road is further suppressed.

Other Embodiments

The present invention should not be construed as being limited to the foregoing embodiment, but may be implemented with the following modifications.

- In the branch road determination, all of steps S111 to S117 do not have to be necessarily performed, but at least either of steps S111 and S112 and any of steps S113 to S117 may be performed. Specifically, the probability of the travel road's being a branch road may be calculated, in respect of a plurality of characteristics of a branch road, including at least either that: the candidate line is a solid line; or the curvature of the travel road is smaller than a predetermined value. Further, the probability of being a branch road may be calculated in respect of at least either of the characteristics that: the candidate line is a solid line; and the curvature of the travel road is smaller than a predetermined value, while the probability of being a branch road is calculated in respect of other characteristics than those of steps S111 to S117.
- When the curvature calculated by the vehicle information acquisition unit 112 is infinite, the probability of being a branch road may be calculated to be smaller, as the calculated curvature is larger, so that the probability of being a branch road is rendered to be a predetermined minimum probability. In other words, no predetermined value is required to be set for the calculated curvature.
- When the curvature calculated by the vehicle information acquisition unit 112 is 0, the probability of being a branch road may be calculated to be higher, as the calculated curvature is smaller, so that the probability of being a branch road is calculated to be a predetermined maximum probability. In other words, no predetermined minimum curvature is required to be set for the calculated curvature.
- When the curvature calculated by the vehicle information acquisition unit 112 is larger than an intermediate curvature set between a predetermined value and a predetermined minimum curvature, the probability of being a branch road may be calculated, for example, to be a predetermined low probability, but when smaller, the probability of being a branch road may be calculated, for example, to be a predetermined high probability. In other words, the probability may be set to two discrete values.
- When the travel road is determined to be a branch road by the branch road determination section 133, the probability of the candidate line as being the boundary line of the main travel road may be ensured to be calculated to be a value other than 0, e.g., 0.1.
- The curvature of the travel road may be an average of the curvature calculated from the shape of the left candidate line and the curvature calculated from the shape of the right candidate line.

REFERENCE SIGNS LIST

10, 111 . . . Camera; 20 . . . Boundary line candidate extraction section; 30 . . . Boundary line characteristics calculation unit; 31 . . . Width calculation section; 32, 131 . . . Vote calculation section; 33, 132 . . . Edge intensity calculation section; 34, 133 . . . Branch road determination section; 40 . . . Boundary line characteristics integration section; 50 . . . Boundary line selection section; 60 . . . Boundary line recognition unit; 70 . . . Image processor;

112 . . . Vehicle information acquisition unit; 112a . . . Yaw rate sensor; 112b . . . Vehicle sensor.

The invention claimed is:

1. A boundary line recognition apparatus comprising:
a camera that is installed in a vehicle to capture an image of a travel road;
a boundary line candidate extraction section that extracts candidate edge points of a boundary line sectioning the travel road, on the basis of a luminance of an image captured by the camera, and extracts a candidate line of the boundary line from a series of the extracted candidate edge points;
a width calculation section that calculates, in the candidate line of the boundary line extracted by the boundary line candidate extraction section, an apparent thickness of the candidate line on the image, which is an apparent perpendicular distance from one side edge of the candidate line to the other side edge of the candidate line, from a width of the candidate line in a horizontal direction of the image and an angle of the candidate line relative to a vertical direction of the image;
a boundary line characteristics calculation unit that calculates a probability of the candidate line as being the boundary line to be higher, as the candidate line has a large degree of having characteristics as a boundary line; and
a boundary line recognition unit that integrates the probabilities calculated by the boundary line characteristics calculation section, in respect of a plurality of the characteristics to recognize the boundary line,
wherein the plurality of the characteristics of the boundary line include that a ratio of the apparent thickness calculated by the width calculation section, to a blur degree of the image is larger than a predetermined value, and
wherein the boundary line characteristics calculation unit calculates the probability to be lower, as the ratio of the apparent thickness to the blur degree of the image is smaller.

2. The boundary line recognition apparatus according to claim 1, wherein the boundary line characteristics calculation unit calculates the probability to be a predetermined minimum probability, when the ratio of the apparent thickness to the blur degree of the image is smaller than the predetermined value.

3. The boundary line recognition apparatus according to claim 1, wherein the boundary line characteristics calculation section calculates the probability to be a predetermined maximum probability, when the ratio of the apparent thickness to the blur degree of the image is larger than a predetermined maximum value that is set to be larger than the predetermined value.

4. The boundary recognition apparatus according to claim 1, wherein a blur degree of the image is a predetermined width of a primary differential distribution calculated by first-differentiating a luminance of surroundings that include the candidate edge points in a horizontal direction of the image.

5. The boundary line recognition apparatus according to claim 1, wherein a blur degree of the image is a width where luminance of from a first predetermined value to a second predetermined value that is larger than the first predetermined value is distributed in a luminance distribution of surroundings that include the candidate edge points distributed in a horizontal direction of the image.

6. The boundary line recognition apparatus according to claim 1, wherein a blur degree of the image is a conversion value obtained by converting a specification value of an amount of blurring of a lens possessed by the camera into a length on the image.

7. The boundary line recognition apparatus according to claim 6, wherein:
the vehicle includes a rain detecting means and a fog detecting means; and
when rain or fog is detected by the rain detecting means and the fog detecting means, the conversion value of a specification value of the amount of blurring is corrected to be a larger value then when the rain or the fog is not detected.

8. The boundary line recognition apparatus according to claim 1, wherein the boundary line characteristics calculation unit calculates the probability to be a predetermined minimum probability, when the ratio of the apparent thickness to the blur degree of the image is smaller than the predetermined value.

9. The boundary line recognition apparatus according to claim 1, wherein the boundary line characteristics calculation section calculates the probability to be a predetermined maximum probability, when the ratio of the apparent thickness to the blur degree of the image is larger than a predetermined maximum value that is set to be larger than the predetermined value.

10. The boundary line recognition apparatus according to claim 1, further comprising:
a vote calculation section configured to minimize the probability of the candidate line as being a boundary line if the number of votes through Hough transform is smaller than a predetermined number;
an edge intensity calculation section configured to minimize the probability of the candidate line as being a boundary line if the candidate line has, as signal intensities, an edge intensity smaller than a predetermined value; and
a branch road determination section configured to minimize the probability of the candidate line as being a boundary line if the branch road determination section determines the travel road to be a branch road.

* * * * *